US012689964B2

(12) United States Patent
Dong

(10) Patent No.: US 12,689,964 B2
(45) Date of Patent: Jul. 21, 2026

(54) METHODS FOR CHANNEL SWITCHING AND ELECTRONIC DEVICE

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 598 days.

(21) Appl. No.: 18/017,046

(22) PCT Filed: Aug. 11, 2020

(86) PCT No.: PCT/CN2020/108411
§ 371 (c)(1),
(2) Date: Jan. 19, 2023

(87) PCT Pub. No.: WO2022/032475
PCT Pub. Date: Feb. 17, 2022

(65) Prior Publication Data
US 2023/0328619 A1 Oct. 12, 2023

(51) Int. Cl.
*H04W 4/00* (2018.01)
*H04W 40/02* (2009.01)
*H04W 52/02* (2009.01)

(52) U.S. Cl.
CPC ....... *H04W 40/02* (2013.01); *H04W 52/0216* (2013.01)

(58) Field of Classification Search
CPC . H04W 40/02; H04W 52/0216; H04W 84/12; H04W 36/06; H04W 28/08
USPC ................................................. 370/329, 330
See application file for complete search history.

(56) References Cited

U.S. PATENT DOCUMENTS

| | | | | |
|---|---|---|---|---|
| 2013/0201918 A1* | 8/2013 | Hirakawa | ............. | H04W 36/06 |
| | | | | 370/328 |
| 2016/0142951 A1 | 5/2016 | Balasubramanian et al. | | |
| 2018/0132149 A1* | 5/2018 | Zhao | ...................... | H04W 48/12 |
| 2019/0223056 A1 | 7/2019 | Bajko | | |
| 2020/0137579 A1* | 4/2020 | Choi | ...................... | H04W 72/20 |

(Continued)

FOREIGN PATENT DOCUMENTS

| | | |
|---|---|---|
| CN | 101621836 A | 1/2010 |
| CN | 109379772 A | 2/2019 |
| CN | 110049521 A | 7/2019 |

OTHER PUBLICATIONS

European Patent Application No. 20948974.9 Search Report dated Apr. 16, 2024, 12 pages.

(Continued)

*Primary Examiner* — Chuong T Ho
(74) *Attorney, Agent, or Firm* — Cozen O'Connor

(57) ABSTRACT

A method performed by an access point includes determining a first message from on a link, wherein the first message frame comprises channel switching information of more than one link; and sending the first message frame on the more than one link. A method performed by a station includes receiving a first message frame, wherein the first message frame comprises channel switch information, and the channel switch information comprises channel switch count information determined based on more than one link; and performing channel switching based on the channel switch count information.

19 Claims, 2 Drawing Sheets

(56)                     References Cited

U.S. PATENT DOCUMENTS

| | | | | |
|---|---|---|---|---|
| 2021/0250848 A1* | 8/2021 | Seok | .................... | H04W 48/16 |
| 2021/0274500 A1* | 9/2021 | Cariou | ................. | H04W 48/08 |
| 2021/0337613 A1* | 10/2021 | Seok | .................... | H04W 76/15 |
| 2022/0110119 A1* | 4/2022 | Song | ...................... | H04L 5/001 |
| 2022/0132433 A1* | 4/2022 | Sun | ...................... | H04W 52/42 |
| 2022/0346176 A1* | 10/2022 | Jang | ..................... | H04W 28/18 |

OTHER PUBLICATIONS

Indian Patent Application No. 202347004757 Office Action dated May 14, 2024, 3 pages.
PCT/CN2020/108411 English translation of International Search Report dated Apr. 28, 2021, 2 pages.

* cited by examiner

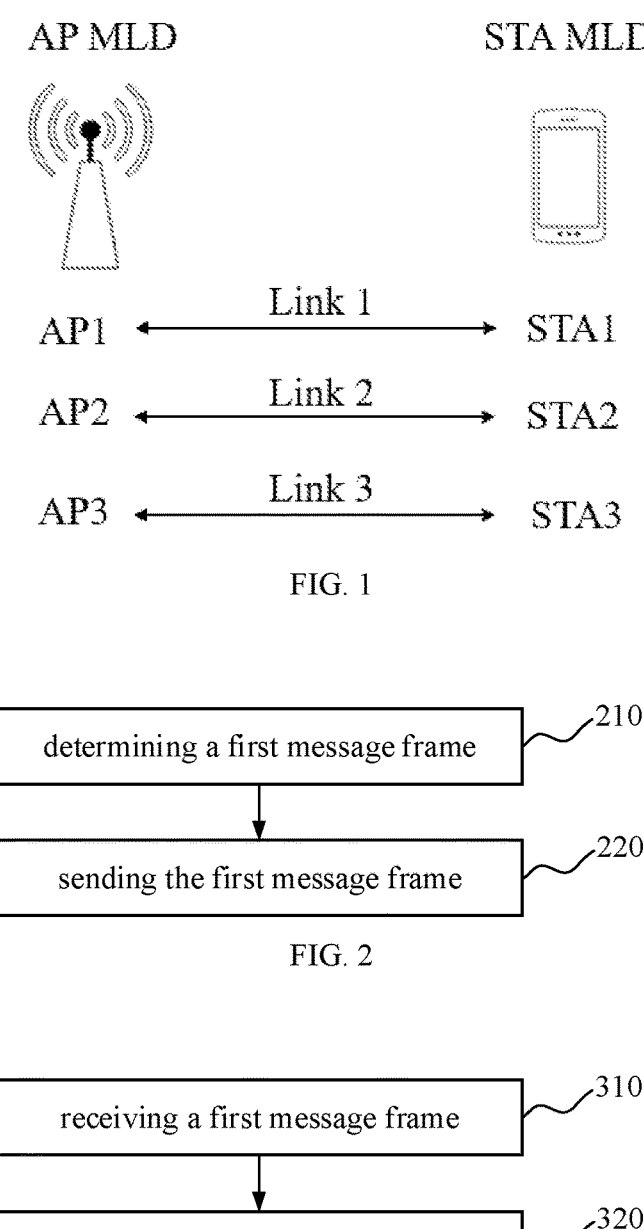

FIG. 1

```
┌─────────────────────────────────────┐
│  determining a first message frame  │ ⌇210
└─────────────────────────────────────┘
                   │
                   ▼
┌─────────────────────────────────────┐
│   sending the first message frame   │ ⌇220
└─────────────────────────────────────┘
```

FIG. 2

```
┌─────────────────────────────────────┐
│   receiving a first message frame   │ ⌇310
└─────────────────────────────────────┘
                   │
                   ▼
┌─────────────────────────────────────┐
│   performing channel switching      │ ⌇320
└─────────────────────────────────────┘
```

FIG. 3

```
┌───────────────────────────────────────────────┐
│          communication device 400             │
│                                               │
│  ┌─────────────────┐  ┌─────────────────┐    │
│  │ processing module│  │ sending module  │    │
│  │       410        │  │      430        │    │
│  └─────────────────┘  └─────────────────┘    │
└───────────────────────────────────────────────┘
```

FIG. 4 communication device 500

| | |
|---|---|
| processing module 510 | receiving module 530 |

FIG. 5

METHODS FOR CHANNEL SWITCHING AND ELECTRONIC DEVICE

CROSS-REFERENCE TO RELATED APPLICATION

This application is the U.S. national phase application of International Application No. PCT/CN2020/108411, filed on Aug. 11, 2020, the entire disclosure of which is incorporated herein by reference.

TECHNICAL FIELD

The present disclosure relates to a wireless communication field, and particularly to a method for channel switching and a communication device.

BACKGROUND

In May 2018, the Institute of Electrical and Electronic Engineers (IEEE) established an IEEE802.11be study group (SG) to study the next generation of Wi-Fi technology (i.e., IEEE802.11a/b/g/n/ac). The scope of the study includes 320 MHz bandwidth transmission, aggregation and coordination of multiple frequency bands, etc. A new standard proposed by the study group is expected to increase rate and throughput by at least four times compared with the existing IEEE802.11ax standard. The main application scenarios are video transmission, augmented reality (AR), virtual reality (VR), etc.

The aggregation and coordination of multiple frequency bands refers to performing simultaneous communication between devices in 2.4 GHz, 5.8 GHz and 6-7 GHz frequency bands. A new media access control (MAC) mechanism needs to be defined to manage the simultaneous communication between devices in the multiple frequency bands. In addition, a low latency transmission is also expected to be supported in the IEEE802.11be standard.

In the discussion of the IEEE802.11be standard, the maximum bandwidth supported is 320 MHz (160 MHz+160 MHz). In addition, 240 MHz (160 MHz+80 MHz) and bandwidths supported in the IEEE802.11ax standard may also be supported.

In the existing standard, a channel switching announcement (CSA) or an extended channel switching announcement (ECSA) in a single link is defined for channel switching operations, as shown in the following Table 1 and Table 2.

In the IEEE802.11be standard, a station (STA) and an access point (AP) can be multi-link devices (MLDs). That is, the function of simultaneously transmitting and/or receiving on more than one link at the same moment may be supported. Therefore, in the IEEE802.11be standard, there may be more than one link between the STA and the AP.

The existing CSA/ECSA is only suitable for communication on a single link, while in the IEEE802.11be standard or other standards, devices may perform multi-link communication. When the AP performs multi-link communication, there may be channel switching on more than one link, so the existing CSA/ECSA mechanism cannot meet the requirements of multi-link communication in the IEEE802.11be standard or other standards.

SUMMARY

According to a first aspect of the present disclosure, a method for channel switching is performed by an access point. The method includes determining a first message frame on a link, in which the first message frame includes channel switch information of more than one link; and sending the first message frame on the more than one link.

According to a second aspect of the present disclosure, a method for channel switching is performed by a station. The method includes receiving a first message frame, in which the first message frame includes channel switch information, and the channel switch information includes channel switch count information determined based on more than one link; and performing channel switching based on the channel switch count information.

According to a third aspect of the present disclosure, an electronic device is provided. The electronic device, includes a processor, and a memory for storing a computer program executable by the processor. When the computer program is executed by the processor, the processor is caused to determine a first message frame on a link, in which the first message frame comprises channel switch information of more than one link; and send the first message frame on the more than one link.

BRIEF DESCRIPTION OF THE DRAWINGS

The above and other features of the embodiments in the present disclosure will be more apparent by the detailed description on the embodiments of the present disclosure with reference to the accompanying drawings.

FIG. 1 is a diagram illustrating a communication scenario on more than one link.

FIG. 2 is a flowchart illustrating a method for channel switching according to an embodiment of the present disclosure.

FIG. 3 is a flowchart illustrating another method for channel switching according to an embodiment of the present disclosure.

FIG. 4 is a block diagram illustrating a communication device according to an embodiment of the present disclosure.

FIG. 5 is a block diagram illustrating another communication device according to an embodiment of the present disclosure.

DETAILED DESCRIPTION

The following description with reference to the accompanying drawings is provided to assist in a comprehensive understanding of various embodiments of the present disclosure as defined by the appended claims and their equivalents. Various embodiments of the disclosure include various specific details, but these are to be regarded as exemplary only. In addition, descriptions of well-known technologies, functions, and constructions may be omitted for clarity and conciseness.

The terms and words used in the present disclosure are not limited to the written meanings, but are merely used by the inventor to enable a clear and consistent understanding of the present disclosure. Accordingly, for those skilled in the art, the description of various embodiments in the present disclosure is provided for purposes of illustration only and not for purposes of limitation.

It should be understood that as used herein, the singular forms "a", "an", "said" and "the" may include the plural forms unless the context clearly dictates otherwise. It should be further understood that the word "comprises" used in this disclosure refers to the presence of described features, integers, steps, operations, elements and/or components, but does not exclude the presence or addition of one or more other features, integers, steps, operations, elements, components and/or their combination.

It will be understood that, although the terms "first", "second", etc. may be used herein to describe various elements, these elements should not be limited by these terms. These terms are only used to distinguish one element from another. Thus, a first element discussed below can be referred to as a second element without departing from the teachings of embodiments.

It will be understood that when an element is referred to as being "connected" or "coupled" to another element, it may be directly connected or coupled to the other element or there may also be a middle element. Additionally, "connected" or "coupled" as used herein may include wireless connection or wireless coupling. As used herein, the term "and/or" or the expression "at least one of" includes any and all combinations of one or more associated listed items.

The definitions in a channel switching announcement (CSA) and an extended channel switching announcement (ECSA) in the existing standards are shown in Table 1 and Table 2 below.

TABLE 1

| | | CSA: channel switching announcement | | |
|---|---|---|---|---|
| Element ID | Length | Channel Switch Mode | New Channel Number | Channel Switch Count |
| Octets: 1 | 1 | 1 | 1 | 1 |

TABLE 2

| | | ECSA: extended channel switching announcement | | | |
|---|---|---|---|---|---|
| Element ID | Length | Channel Switch Mode | New Operating Class | New Channel Number | Channel Switch Count |
| Octets: 1 | 1 | 1 | 1 | 1 | 1 |

In Table 1 and Table 2, the Element ID field indicates an element identifier number of CSA or ECSA. The Length field represents a length value. The Channel Switch Mode field indicates a channel switching mode, specifically, it may indicate restrictions on transmission until a channel switch. For example, an AP or independent basic service set (IBSS) STA may set the Channel Switch Mode field to either 0 or 1 on transmission. The New Channel Number field represents a serial number of the new channel, specifically, may be set to the number of the channel to which the STA is switching. The Channel Switch Count field represents a channel switch count, which either may be set to a number of target beacon transmission time (TBTT) until the STA sending the channel switch announcement element (CSA or ECSA) switches to the new channel or may be set to 0, specifically for the STA in the BSS. In addition, the Channel Switch Count field is set to 1, which indicates that the switch occurs immediately before the next TBTT; and the Channel Switch Count field is set to 0, which indicates that the switch occurs at any time after the frame containing the element is transmitted. The New Operating Class field represents a new operating class, which is set to the number of the operating class after the channel switch.

As mentioned above, the existing CSA/ECSA is only suitable for communication in a single link, while in the IEEE802.11be standard or other standards, devices may perform multi-link communication. When the AP performs multi-link communication, there may be channel switching on more than one link. According to the embodiments of the present disclosure, a newly defined CSA/ECSA information element is provided to meet the requirements of multi-link communication.

The exemplary embodiments of the present disclosure may be described in detail below with reference to the accompanying drawings.

FIG. 1 is an exemplary diagram illustrating a communication scenario on more than one link.

In an embodiment of the present disclosure, the AP may include software applications and/or circuits that enable other types of nodes in a wireless network to communicate with the outside and inside of the wireless network through the AP. The AP may communicate with the STA on different time-frequency resources. As an example, the AP may be a terminal device or a network device equipped with a wireless fidelity (Wi-Fi) chip. As an example, the STA may include, but is not limited to: a cellular phone, a smart phone, a wearable device, a computer, a personal digital assistant (PDA), a personal communication system (PCS) device, a personal information manager (PIM), a personal navigation device (PND), a Global Position System (GPS), a multimedia device, an Internet of Things (IoT) device, etc.

In an embodiment of the present disclosure, STAs and APs may support a multi-link function. For ease of description, an example that one AP communicates with one STA on more than one link is mainly described below, which is however not limited by the embodiments of the present disclosure.

In FIG. 1 only as an example, AP-MLD may represent an access point supporting the multi-link communication function, and STA-MLD may represent a station supporting the multi-link communication function. Referring to FIG. 1, AP MLD may operate on three links, such as AP1, AP2 and AP3 shown in FIG. 1, and STA MLD may also operate on three links, such as STA1, STA2 and STA3 shown in FIG. 1. In the example in FIG. 1, it is assumed that AP1 and STA1 communicate through a corresponding link, i.e., Link 1. Similarly, AP2 communicates with STA2 through Link 2, and AP3 communicates with STA3 through Link 3. In addition, Link 1 to Link 3 may be more than one link at different frequencies, for example, links at 2.4 GHz, 5 GHZ, and 6 GHz, and so on. Additionally, there may be multiple channels in each link. However, it should be understood that the communication scenario shown in FIG. 1 is only exemplary, and concepts disclosed herein are not limited to this scenario. For example, the AP MLD may be connected to multiple STA MLDs or may be connected to a STA that only supports a single link (i.e., a STA that only supports the existing standards, which can be referred to simply as an old STA). Alternatively, the AP may communicate with multiple STAs on each link.

When communicating on more than one link, the CSA/ECSA information elements on this link (Link 1) may be broadcast on Link 2 and Link 3, for example, through a beacon frame or a probe response frame if AP1 is about to switch channels. The newly defined CSA/ECSA information elements may be included in the beacon frame or probe response frame. According to an embodiment of the present disclosure, the newly defined CSA/ECSA information element is in an MLD level rather than a link level, which may be described in detail later with reference to FIGS. 2 and 3.

FIG. 2 is a flowchart illustrating a method for channel switching according to an embodiment of the present disclosure.

Referring to FIG. 2, at 210, the AP may determine a first message frame. Specifically, the AP may determine the first message frame on one link. According to an embodiment of the present disclosure, the first message frame may be a beacon frame or a probe response frame broadcast by the AP, which is however not limited by the embodiment of the present disclosure. The first message frame may be any other type, depending on a communication environment. In an embodiment, the first message frame may be determined according to the communication capability of the AP and the current communication environment. In another embodiment, the pre-stored or pre-written first message frame may be obtained directly.

In an embodiment of the present disclosure, the first message frame (e.g., a beacon frame or a probe response frame) may include channel switch information of more than one link. The channel switch information of more than one link may be the newly defined CSA/eCSA information element, which may be called enhanced CSA (eCSA) or enhanced ECSA (eeCSA). The manner in which the newly defined CSA/eCSA information element is used to indicate channel switching may be called an explicit indicating manner, which may be described below.

According to an embodiment of the present disclosure, the first link (e.g., the above Link 1) may be a link that needs to perform channel switching. The more than one link may include the first link (e.g., the above Link 1) and other link (e.g., the above Link 2 and Link3) different from the first link. According to an embodiment of the present disclosure, the channel switch information of more than one link includes channel switch information of the first link. In addition, the channel switch information of more than one link includes channel switch information of other link. Details may be described later below.

In an example, the AP may determine the first message frame on the link that needs to perform channel switching (e.g., the above Link 1), and may also determine the first message frame on any link among the more than one link, which is not specifically limited by the present disclosure.

The eCSA according to the embodiment of the present disclosure may be a redefinition of the CSA in Table 1, and a specific format of the eCSA may be shown in Table 3 below. The eeCSA according to the embodiment of the present disclosure may be a redefinition of the ECSA in Table 2, and a specific format of the eeCSA may be shown in Table 4 below.

TABLE 3

| eCSA: enhanced channel switching announcement | | | | | | |
|---|---|---|---|---|---|---|
| Element ID | Length | Channel Switch Mode | New Channel Number | Channel Switch Count | Link ID | . . . |

TABLE 4

| eECSA: enhanced extended channel switching announcement | | | | | | |
|---|---|---|---|---|---|---|
| Element ID | Length | Channel Switch Mode | New Operating Class | New Channel Number | Channel Switch Count | Link ID | . . . |

Referring to Table 3 and Table 4, the channel switch information of more than one link (for example, eCSA and eeCSA) may include channel switch count information (Channel Switch Count). According to an embodiment of the present disclosure, the channel switch count information is different for each link of the more than one link.

During the formulation of the IEEE802.11be standard, the following conclusions may be drawn for the STA in power save (PS): each non-AP STA MLD affiliated with a non-AP MLD that is operating on an enabled link maintains its own power state/mode. That is, the PS state of the STA on each link is independent of each other. The non-AP STA MLD and the AP MLD support the function of simultaneously transmitting and/or receiving on more than one link at the same moment.

In the existing standards, the channel switch should be scheduled so that all STAs in the BSS, including STAs in a power save mode, have the opportunity to receive at least one Channel Switch Announcement element before the switch.

According to the above description, it may be known that no matter in the existing standard or in a more advanced standard (for example, IEEE802.11be standard), the STA in the power save mode should also receive the channel switch information to perform channel switching.

Considering that the eCSA/eeCSA is an MLD-level information element in the present disclosure, the channel switch count information in the embodiment of the present disclosure may include: a first time determined based on a wake up period of a device for receiving the first message frame on each link of the more than one link. As an example, the device may be the STA described above.

As an example, a value of the channel switch count information according to an embodiment of the present disclosure includes the item T (i.e., the first time) represented by the following Equation 1:

$$T = \mathrm{Min}(\mathrm{MAX}(\text{wake up period of each associated } MLD \ STA \text{ in link 1}), \hspace{2em} \text{Equation 1}$$
$$\mathrm{MAX}(\text{wake up period of each associated } MLD \ STA \text{ in link 2}),$$
$$\mathrm{MAX}(\text{wake up period of each associated } MLD \ STA \text{ in link } n))$$

In Equation 1, Min represents a function that takes a minimum value, and MAX represents a function that takes a maximum value. The "wake up period of each associated MLD STA in link 1" represents a wake up time period of each associated STA supporting more than one link on link 1. The "wake up period of each associated MLD STA in link 2" represents a wake up time period of each associated STA supporting more than one link on link 2. The "wake up period of each associated MLD STA in link n" represents a wake up time period of each associated STA supporting more than one link on link n.

According to Equation 1, it may be seen that the first time included in the channel switch count information is related to more than one link, and more specifically, is related to a wake up period of each STA on each link of the more than one link.

In addition, since a time point at which the MLD AP sends the first message frame (for example, a beacon frame or a probe response frame) is different on each link, there is an offset on the time. Therefore, the channel switch count information may also include: an offset time corresponding to each link of the more than one link.

As an example, the channel switch count information according to an embodiment of the present disclosure may be set as: T+time offset (for example, which may be expressed as a second time).

According to an embodiment, the time offset between respective links may be set to be different. According to another embodiment, one of the more than one link (e.g., the first link that needs to perform channel switching) may be set as a reference link, and the time offset on other link is set with reference to the reference link.

Continuing to refer to Table 3 and Table 4, the channel switch information may further include a link identifier corresponding to the first link. That is to say, the channel switch information may also include a link identifier corresponding to the link that needs to perform channel switching. For example, when the first link is the link that needs to perform channel switching, the Link ID in Table 3 and Table 4 may be the link identifier corresponding to the first link. In addition, when the more than one link needs to perform channel switching, the channel switch information indicated in Table 3 or Table 4 may include respective link identifiers corresponding to the more than one link.

However, this is only exemplary, and the channel switch information according to an embodiment of the present disclosure may not include a link identifier. For example, the link that needs to perform channel switching may be automatically determined according to the setting of the offset time and the reference link.

Continuing to refer to Table 3 and Table 4, the channel switch information may further include: an element identifier for indicating a type of the channel switch information. For example, the Element ID in Table 3 and Table 4 may be used to indicate whether the type of the channel switch information in the present disclosure is an eCSA or an eeCSA. In an example, at least one bit in a reserved value of the Element ID in the existing standard may be used to indicate the eCSA or eeCSA newly defined in the present disclosure.

The channel switch information may also include Length, Channel Switch Mode, Channel Switch Mode and/or New Operating Class, the meanings of which are similar to those described above with reference to Table 1 and Table 2, which are not repeated here for conciseness.

Referring back to FIG. 2, at 220, the first message frame may be sent on more than one link. For example, the first message frame may be broadcast through a beacon frame or a probe response frame on the above-mentioned first link or another link. The eCSA or eeCSA included in the first message frame broadcast on each link may have a format as defined in Table 3 or Table 4.

In addition, according to an embodiment of the present disclosure, a link where channel switching occurs may also be indicated in an implicit manner. The implicit manner may refer to using other information other than indicators to indicate the link where channel switching occurs. Specifically, it is possible on one link to indicate CSAs or ECSAs of which links have changed, but specific information of the changed CSA or ECSA needs to be sent on the corresponding link. Here, one link may refer to any link among the more than one link. The fact that the CSA or ECSA has changed may indicate that the corresponding link needs to perform channel switching.

In this case, the channel switch information of more than one link at 210 may indicate that the channel switch information corresponding to at least one link that needs to perform channel switching has changed. That is to say, the channel switch information of more than one link at 210 implicitly indicates channel switch information of which links have changed.

The method for channel switching according to an embodiment of the present disclosure may include: sending channel switch information corresponding to the at least one link on the at least one link. Here, the sent channel switch information indicates specific channel switch information of the at least one link that needs to perform channel switching.

For example, the Link 2 and Link 3 in FIG. 1 are links that need to perform channel switching, that is, the channel switch information sent on the Link 2 and Link 3 has changed. It is possible to indicate that the channel switch information corresponding to the Link 2 and Link 3 has changed on any link among the Link 1, the Link 2, and the Link 3, send on the Link 2 specific channel switch information corresponding to Link 2 (for example, CSA or ECSA on the Link 2), and send on the Link 3 specific channel switch information corresponding to Link 3 (for example, CSA or ECSA on the Link 3).

The method for channel switching according to an embodiment of the present disclosure may include sending channel switch information on each link of the more than one link. The channel switch information has the same format as the CSA or the ECSA. That is to say, when channel switch information of which links has changed are implicitly indicated in the above embodiment, the format of the channel switch information sent on each link does not need to be redefined as in the above explicit indicating manner, but the format in the existing standard (as shown in Table 1 or Table 2) may be directly used.

The method for channel switching shown in FIG. 2 is only exemplary, which is not limited by the embodiments of the present disclosure, for example, more or fewer steps may be included. In an example, the method for channel switching according to an embodiment of the present disclosure may further include in response to presence of a first device that does not support multi-link communication, sending the first message frame on the first link. The channel switch information of the first message frame has a format that the first device can identify.

The first device that does not support multi-connectivity communication may refer to a STA that only supports the existing standards (i.e., an old STA). That is, when there is the STA that only supports the existing standards among the STAs connected to the AP MLD, for example, when the AP MLD communicates with the old STA on one link (e.g., the above first link that needs to perform a channel switch), the method for channel switching according to the embodiment of the present disclosure may also achieve backward compatibility with the old STA. Specifically, when there is a first device that does not support multi-link communication (that is, the old STA), the channel switch information (for example, the CSA or ECSA shown in Table 1 or Table 2) that the first device can identify may be included in the first message frame (e.g., a beacon frame or a probe response frame) in the form of an independent information element. In other words, when there is an old STA, channel switch information in a format defined by the existing standards may be sent on a link that needs to perform channel switching, so as to prevent the old STA from being unable to parse the newly defined channel switch information of more than one link according to the present disclosure, and thus achieve the backward compatibility.

FIG. 3 is a flowchart illustrating another method for channel switching according to an embodiment of the present disclosure.

Referring to FIG. 3, at 310, the STA may receive a first message frame. The first message frame includes channel switch information. In addition, a format of the channel switch information in the first message frame may be similar to the above Table 3/Table 4 (for the MLD STAs), or the above Table 1/Table 2 (for the old STAs).

For example, the channel switch information may include channel switch count information determined based on more than one link. According to an embodiment of the present disclosure, the channel switch count information of the channel switch information in the first information frame received on each link, may be as described with reference to Equation 1 and the offset time. That is to say, the channel switch count information according to an embodiment of the present disclosure may include: a first time determined based on a wake up period of a device for receiving the first message frame on each link of the more than one link and an offset time corresponding to each link of the more than one link. For example, the channel switch information may have a format that the first device can identify. The first device does not support multi-link communication.

Continuing to refer to FIG. 3, at 320, channel switching may be performed based on the channel switch count information. For example, the STA may wait for a time defined in the channel switch count information, and then switch to a new channel. Information about the new channel to be switched to may be obtained from the channel switch information described in the Table 3/Table 4, or the Table 1/Table 2.

The method for channel switching shown in FIG. 3 is only exemplary, which is not limited by the embodiments of the present disclosure, for example, more or fewer steps may be included. In an example, the method for channel switching according to an embodiment of the present disclosure may further include in response to receiving the first message frames respectively on the more than one link, retaining the first message frame received first. In this case, at 320, channel switching may be performed according to the retained first message frame, which is however not limited in the present disclosure. For example, no matter in which link the STA receives the first message frame including channel switch information, the STA may perform channel switching according to the included channel switch information, without a need to wait and receive channel switch information from other link.

According to an embodiment of the present disclosure, step 320 may include: in response to receiving a first message frame on other link than the first link (the first link is the link that needs to perform channel switching as described above), switching to a new channel after waiting for a second time indicated by the channel switch count information of the first message frame.

That is to say, although the first link is the link that needs to perform channel switching, the STA receives the first message frame on other link (for example, the second link) rather than on the first link, then the STA may switch to the new channel after waiting for the second time (for example, T+offset time) indicated by the channel switch count information of the second link through internal operations. The offset time in the second time is an offset corresponding to the link that receives the first message frame.

The method for channel switching according to the embodiment of the present disclosure enables a device to perform channel switching on more than one link, which achieves the backward compatibility and improves the network throughput.

FIG. 4 is a block diagram illustrating a communication device 400 according to an embodiment of the present disclosure.

Referring to FIG. 4, the communication device 400 may include a processing module 410 and a sending module 430.

The processing module 410 may be configured to: determine a first message frame on a link, wherein the first message frame comprises channel switch information of more than one link. The sending module 430 may be configured to: send the first message frame on the more than one link.

According to an embodiment of the present disclosure, the more than one link includes a first link and other link different from the first link, in which the first link is a link that needs to perform channel switching.

According to an embodiment of the present disclosure, the channel switch information of more than one link includes channel switch information of the first link.

According to an embodiment of the present disclosure, the channel switch information in more than one link includes channel switch information in the other link.

According to an embodiment of the present disclosure, the processing module 410 may be further configured to: in response to presence of a first device that does not support multi-link communication, control the sending module 430 to send the first message frame on the first link. The channel switch information of the first message frame is of a format that the first device can identify.

According to an embodiment of the present disclosure, the channel switch information includes channel switch count information. The channel switch count information is different for each link of the more than one link.

According to an embodiment of the present disclosure, the channel switch count information includes: a first time determined based on a wake up period of a device for receiving the first message frame on each link of the more than one link.

According to an embodiment of the present disclosure, the channel switch count information further includes: an offset time corresponding to each link of the more than one link.

According to an embodiment of the present disclosure, the channel switch information further includes a link identifier corresponding to the first link.

According to an embodiment of the present disclosure, the channel switch information further includes: an element identifier for indicating a type of the channel switch information.

The processing module 410 and the sending module 430 may perform the operations at 210 and 220 shown in FIG. 2, respectively, which are not repeated here for the sake of conciseness.

Figure 5:
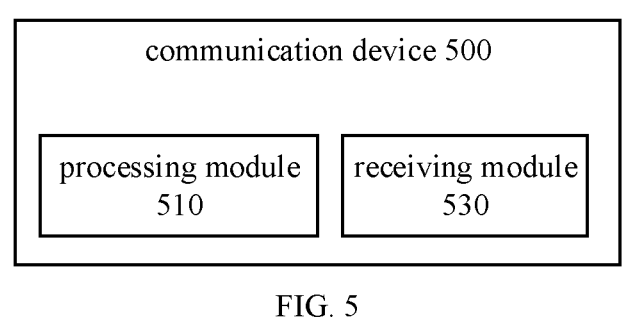

FIG. 5 is a block diagram illustrating another communication device 500 according to an embodiment of the present disclosure.

The communication device 500 may include a processing module 510 and a receiving module 530.

The receiving module 530 may be configured to: receive a first message frame. The first message frame includes channel switch information. The channel switch information includes channel switch count information determined based on more than one link. The processing module 510 may be configured to: perform channel switching based on the channel switch count information.

According to an embodiment of the present disclosure, the processing module 510 may be further configured to: in response to receiving the first message frames respectively on more than one link, retain the first message frame received first.

According to an embodiment of the present disclosure, the processing module 510 may be further configured to: in response to receiving a first message frame on other link than the first link, switch to a new channel after waiting for a second time indicated by the channel switch count information of the first message frame.

The processing module 510 and the sending module 530 may perform the operations at 320 and 310 shown in FIG. 3, respectively, which is not repeated here for the sake of conciseness.

It may be understood that the configurations of the communication devices shown in FIG. 4 and FIG. 5 are only exemplary, which are not limited by the present disclosure. The communication device 400 and the communication device 500 may include more or less modules.

The communication device according to the embodiment of the present disclosure enables the device to perform channel switching on more than one link, which achieves the backward compatibility and improves the network throughput.

In addition, the above-mentioned "modules" may be implemented by a combination of software and/or hardware, which is not specifically limited in this embodiment of the present disclosure.

Based on the same principle as the method according to the embodiments of the present disclosure, the embodiments of the present disclosure also provide an electronic device. The electronic device includes a processor and a memory. Machine-readable instructions (may also be referred to as the "computer program") are stored in the memory. When the machine-readable instructions are executed by the processor, the methods described with reference to FIGS. 2 and 3 may be implemented.

Embodiments of the present disclosure also provide a computer-readable storage medium, on which a computer program is stored. When the computer program is executed by a processor, the methods described with reference to FIG. 2 and FIG. 3 are implemented.

In embodiments, a processor may be used to implement or execute various exemplary logical blocks, modules and circuits described in conjunction with the present disclosure, for example, a central processing unit (CPU), a general processor, a digital signal processor (DSP), an application specific integrated circuit (ASIC), a field programmable gate array (FPGA) or other programmable logic devices, transistor logic devices, hardware components or any of their combinations. The processor may also be a combination that realizes computing functions, for example, a combination of one or more microprocessors, a combination of a DSP and a microprocessor, and the like.

The technical solution according to the embodiments of the present disclosure enables a device to switch channels on more than one link, thus improving network throughput.

In an embodiment, the memory may be for example, read only memory (ROM), a random access memory (RAM), an electrically erasable programmable read only memory (EE-PROM), read memory), a compact disc read only memory (CD-ROM) or other CD storage, optical disc storage (including compact discs, laser discs, optical discs, digital versatile discs, Blu-ray discs, etc.), magnetic disk storage media or other magnetic storage device, or any other media that can be used to carry or store program codes in the form of instructions or data structures and that can be accessed by a computer, which are not limited here.

It should be understood that although the various steps in the flowchart of the accompanying drawings are displayed sequentially according to the arrows, these steps are not necessarily executed sequentially in the order indicated by the arrows. Unless otherwise specified herein, there is no strict order restriction on the execution of these steps, and they can be executed in other orders. In addition, at least some of the steps in the flowcharts of the accompanying drawings may include multiple sub-steps or multiple stages, which are not necessarily executed at the same moment but may be executed at different moments, the execution order of which is not necessarily performed sequentially but may be performed in turn or alternately with at least a part of other steps or sub-steps or stages of the other steps.

Although the present disclosure has been shown and described with reference to certain embodiments of the disclosure, it may be understood by those skilled in the art that various changes in the form and details may be made without departing from the scope of the present disclosure. Therefore, the scope of the present disclosure should not be defined by the embodiments, but should be defined by the appended claims and their equivalents.

What is claimed is:

1. A method for channel switching, performed by an access point, the method comprising:

determining a first message frame on a link, wherein the first message frame comprises channel switch information of more than one link, the channel switch information comprises link identifiers corresponding to the more than one link that needs to perform channel switching, and channel switch count information; wherein the channel switch count information corresponds to each link of the more than one link and the channel switch count information is different for each link of the more than one link; and sending the first message frame on the more than one link.

2. The method of claim 1, wherein the more than one link comprises a first link and other link different from the first link, wherein the first link is a link that needs to perform channel switching.

3. The method of claim 2, wherein the channel switch information of the more than one link comprises channel switch information of the first link.

4. The method of claim 3, wherein the channel switch information of the more than one link comprises channel switch information of the other link.

5. The method of claim 3, further comprising:

in response to presence of a first device that does not support multi-link communication, sending the first message frame on the first link, wherein the channel switch information of the first message frame is of a format that the first device can identify.

6. The method of claim 1, wherein the channel switch count information comprises: a first time determined based on a wake up period of a device for receiving the first message frame on each link of the more than one link.

7. The method of claim 6, wherein the channel switch count information further comprises: an offset time corresponding to each link of the more than one link.

8. The method of claim 1, wherein the link identifiers comprise-a link identifier corresponding to the first link.

9. The method of claim 1, wherein the channel switch information further comprises: an element identifier for indicating a type of the channel switch information.

10. The method of claim 1, wherein the channel switch information of more than one link indicates that channel switch information corresponding to at least one link that needs to perform channel switching has changed.

11. The method of claim 10, comprising: sending the channel switch information corresponding to the at least one link on the at least one link.

12. The method of claim 10, comprising: sending channel switch information on each link of the more than one link, wherein a format of the channel switch information is the same as a format of a channel switching announcement (CSA) or a format of an extended channel switching announcement (ECSA).

13. A non-transitory computer-readable storage medium having a computer program stored thereon, wherein when the computer program is executed by a processor, the method of claim 1 is implemented.

14. A method for channel switching, performed by a station, the method comprising:

receiving a first message frame on more than one link, wherein the first message frame comprises channel switch information, the channel switch information comprises channel switch count information determined based on the more than one link, and link identifiers corresponding to the more than one link that needs to perform channel switching; wherein the channel switch count information corresponds to each link of the more than one link and the channel switch count information is different for each link of the more than one link; and performing channel switching based on the channel switch count information.

15. The method of claim 14, wherein the channel switch count information comprises: a first time determined based on a wake up period of a device for receiving the first message frame on each link of the more than one link.

16. The method of claim 15, wherein the channel switch count information further comprises: an offset time corresponding to each link of the more than one link.

17. The method of claim 14, further comprising:

in response to receiving the first message frames respectively on the more than one link, retaining the first message frame received first.

18. The method of claim 14, wherein performing channel switching based on the channel switch count information comprises:

in response to receiving a first message frame on other link than the first link, switching to a new channel after waiting for a second time indicated by the channel switch count information of the first message frame, wherein the first link is a link that needs to perform channel switching.

19. An electronic device, comprising a processor, and a memory for storing a computer program executable by the processor, wherein when the computer program is executed by the processor, the processor is caused to:

determine a first message frame on a link, wherein the first message frame comprises channel switch information of the more than one link, the channel switch information comprises link identifiers corresponding to more than one link that need to perform channel switching, and channel switch count information; wherein the channel switch count information corresponds to each link of the more than one link and the channel switch count information is different for each link of the more than one link; and send the first message frame on the more than one link.

\* \* \* \* \*